M. L. WILLIAMS.
ENGINE.
APPLICATION FILED DEC. 7, 1914.

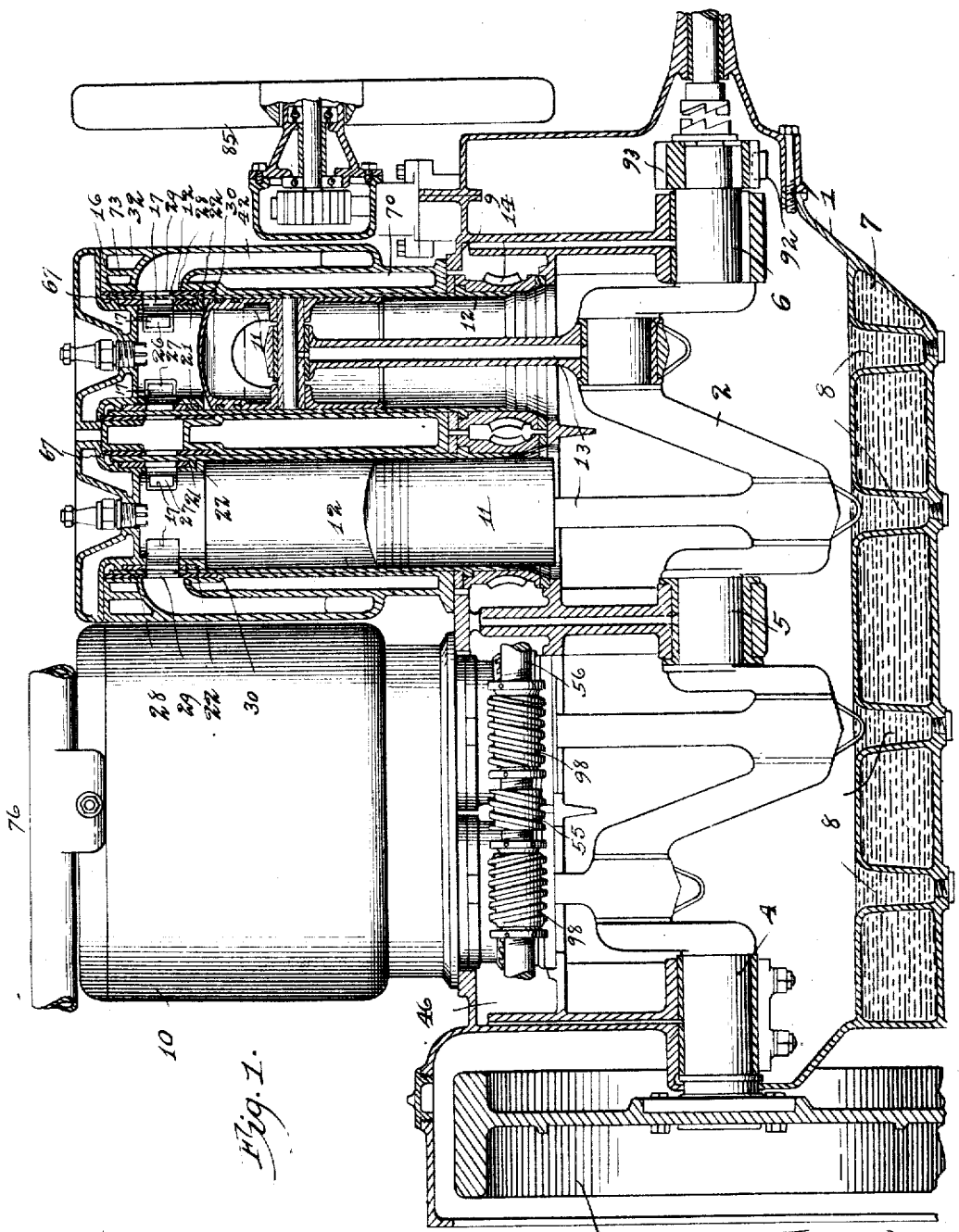

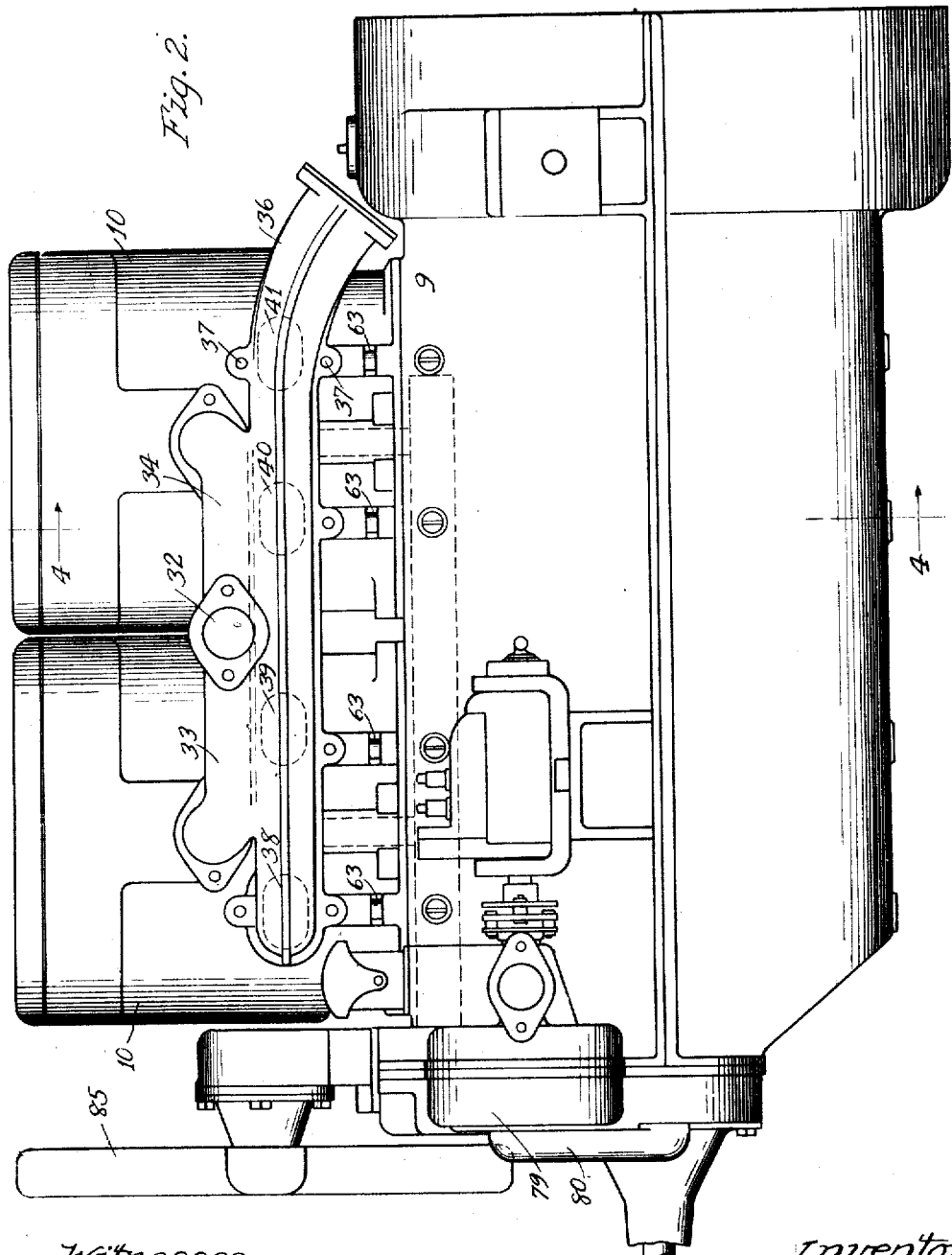

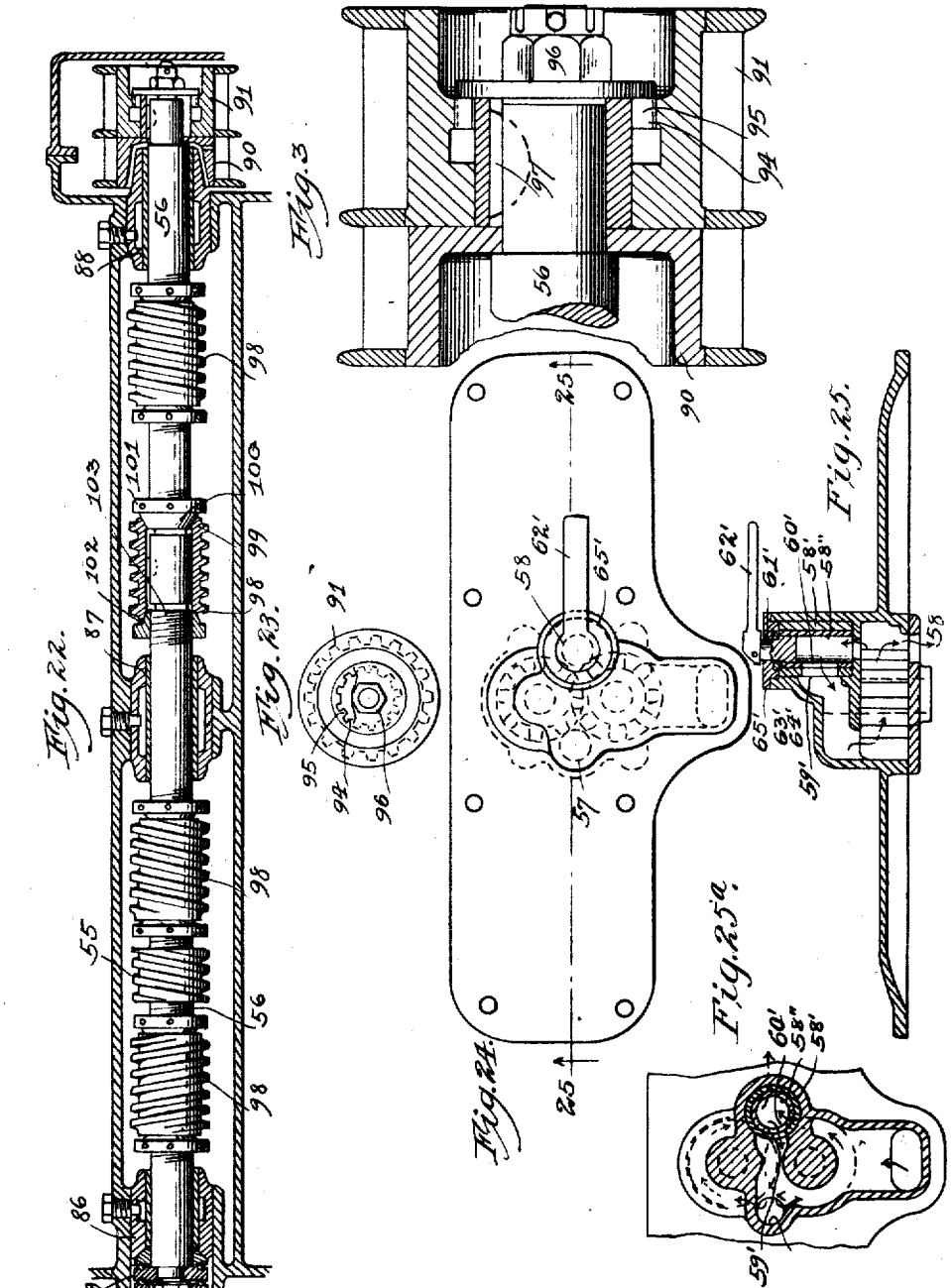

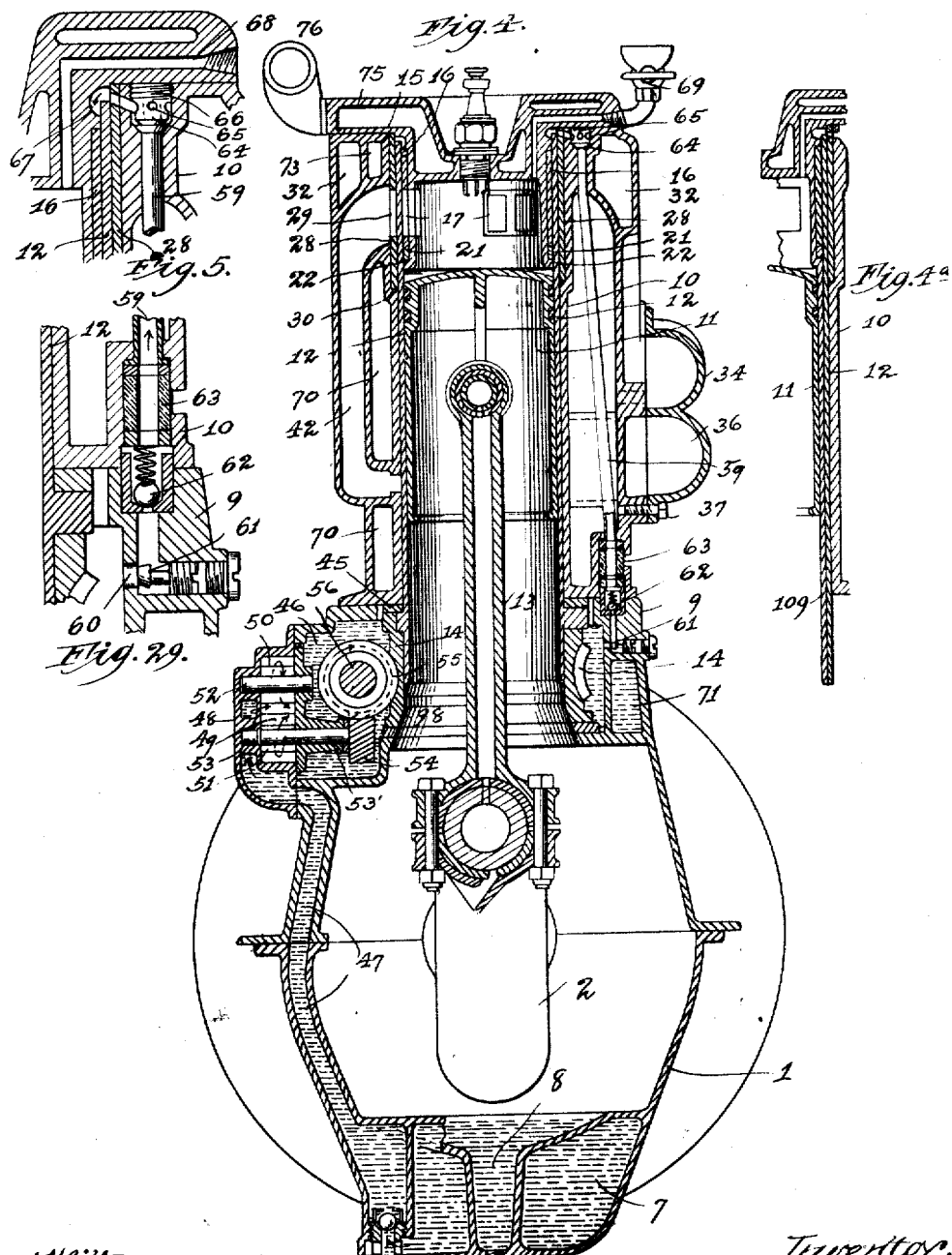

1,308,466.

Patented July 1, 1919.
9 SHEETS—SHEET 5.

M. L. WILLIAMS.
ENGINE.
APPLICATION FILED DEC. 7, 1914.

1,308,466.

Patented July 1, 1919
9 SHEETS—SHEET 6.

Witnesses.
Joyce M. Lutz
C. B. Belknap

Inventor
Martin L. Williams
By Frank L. Belknap
Atty.

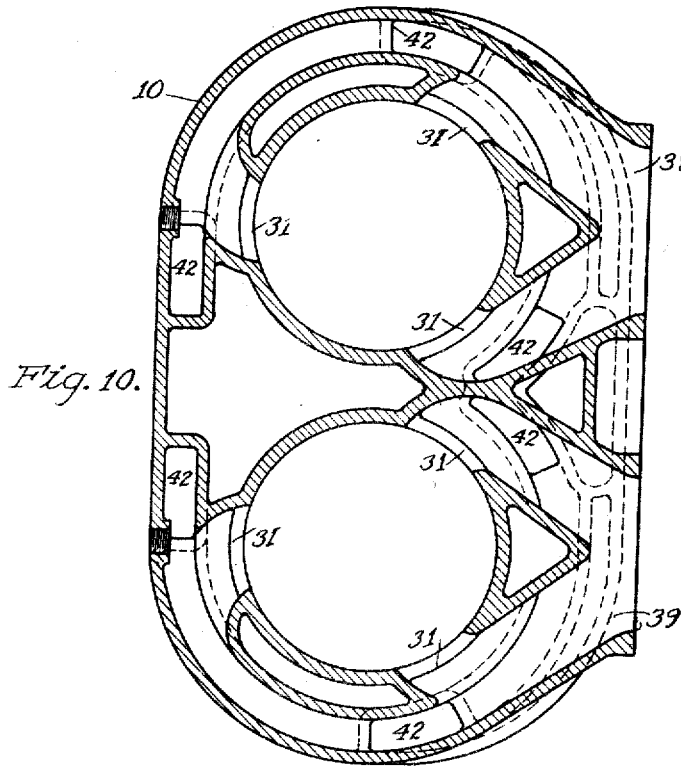
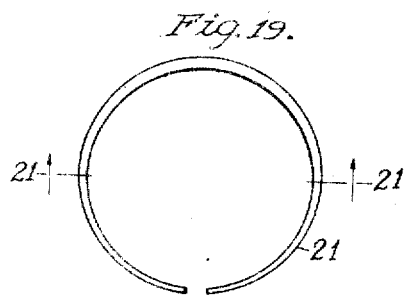
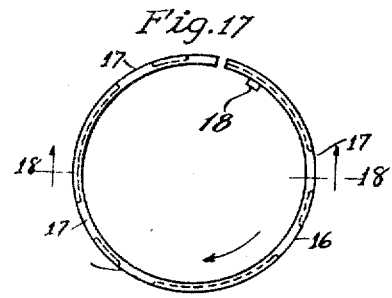
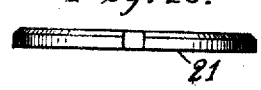
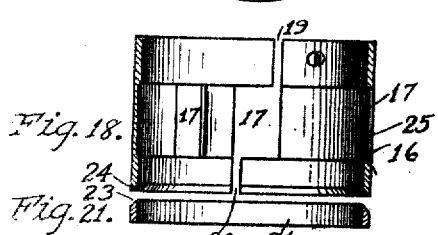

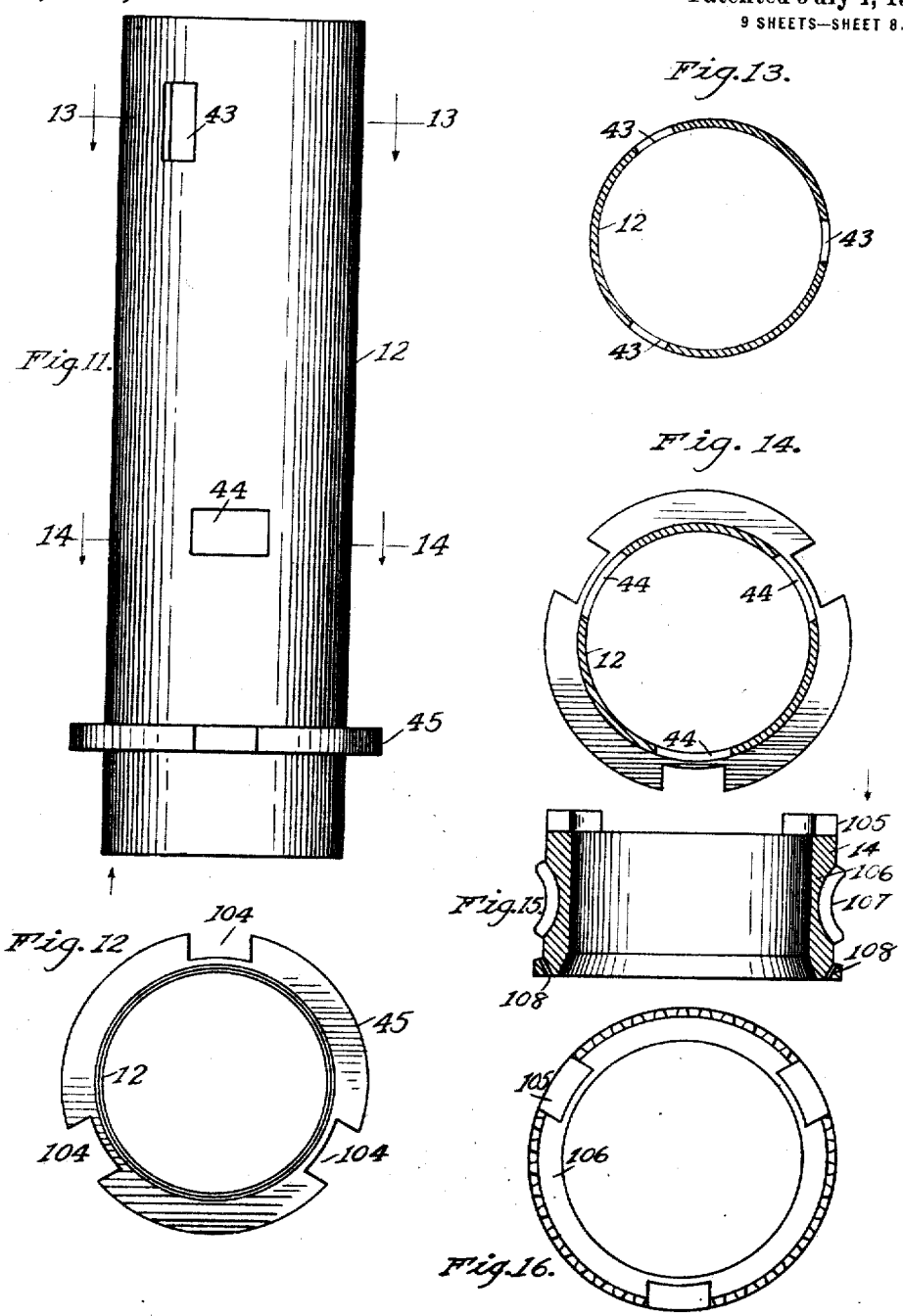

M. L. WILLIAMS.
ENGINE.
APPLICATION FILED DEC. 7, 1914.

1,308,466.

Patented July 1, 1919.
9 SHEETS—SHEET 9.

Witnesses
Joyce M Lutz
C B Belknap

Inventor
Martin L Williams
By Frank L Belknap
atty.

UNITED STATES PATENT OFFICE.

MARTIN L. WILLIAMS, OF SOUTH BEND, INDIANA, ASSIGNOR, BY MESNE ASSIGNMENTS, TO AMERICAN SLEEVE-VALVE MOTOR COMPANY, A CORPORATION OF DELAWARE.

ENGINE.

1,308,466.   Specification of Letters Patent.   Patented July 1, 1919.

Application filed December 7, 1914. Serial No. 875,791.

*To all whom it may concern:*

Be it known that I, MARTIN L. WILLIAMS, a citizen of the United States, residing in the city of South Bend, county of St. Joseph, and State of Indiana, have invented certain new and useful Improvements in Engines, of which the following is a specification.

This invention relates to improvements in engines and refers more particularly to improvements in the lubricating system of a rotary valve four cycle gas engine.

Among the salient objects of the invention are to provide an improved manner and mechanism for lubricating the various operating parts of a gas engine of the rotary valve type; to provide novel means for water-cooling the lubricating fluid; to provide a novel arrangement of the head ring which insures uniform and constant lubrication at the upper part of the cylinder; to provide means for supplying lubricating fluid under pressure to a supplementary casing which incloses a certain valve operating mechanism and is thence conducted to the bearing parts of the cylinders under pressure.

The invention consists in the matters hereinafter described and more particularly pointed out in the appended claims.

In the drawings—

Figure 1 is a view partly in side elevation and partly in vertical section of my improved engine;

Fig. 2 is a side elevation of the opposite side of the engine shown in Fig. 1;

Fig. 3 is a detail view on an enlarged scale of the worm shaft adjusting mechanism;

Fig. 4 is a transverse vertical sectional view taken substantially on lines 4—4 of Fig. 2 and looking in the direction of the arrows;

Figure 6:
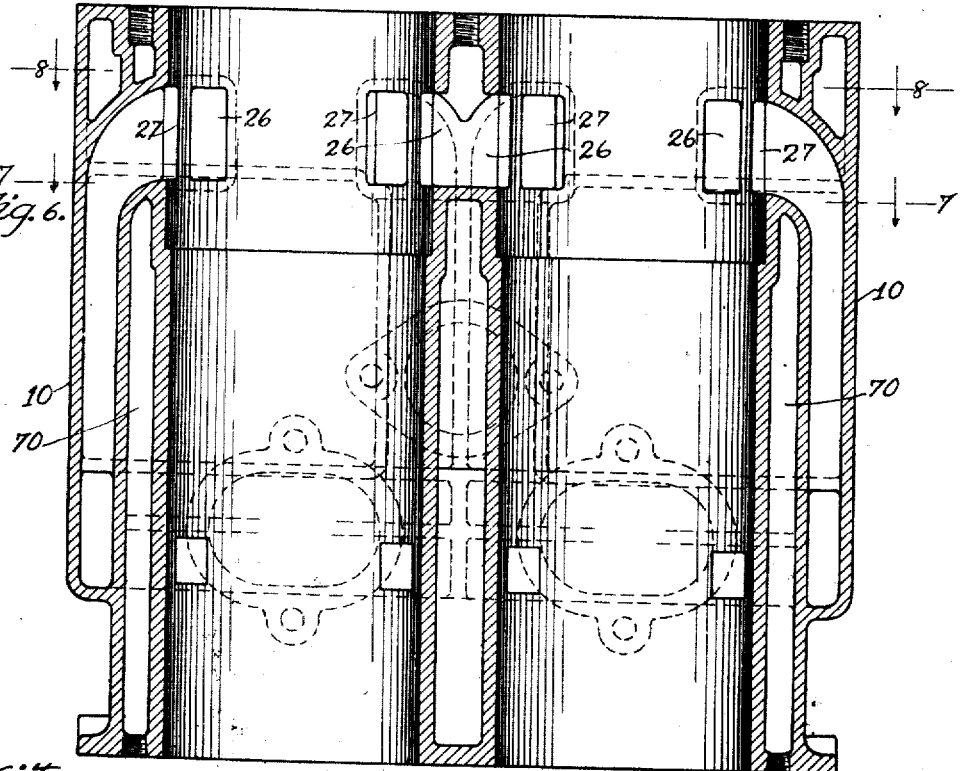

Fig. 4^A is a fragmentary vertical sectional view showing a modified form of arranging the rotary valve sleeve relative to the piston;

Fig. 5 is a detail showing the manner in which the oil enters the cylinder head;

Fig. 6 is a vertical sectional view taken longitudinally through the cylinders.

Figure 7:
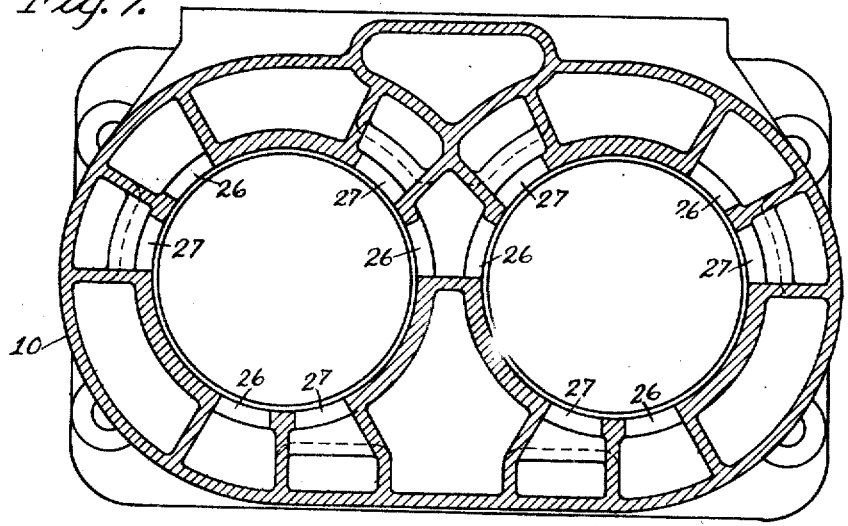
Figure 8:
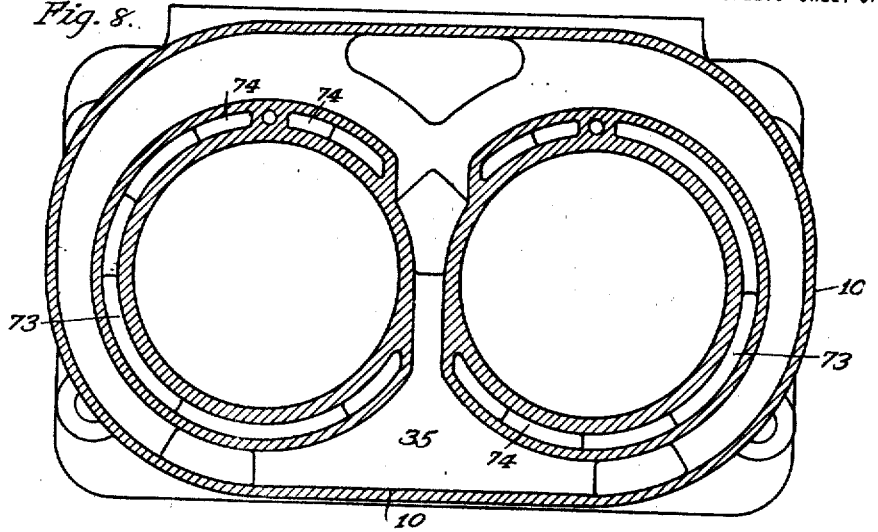
Figure 9:
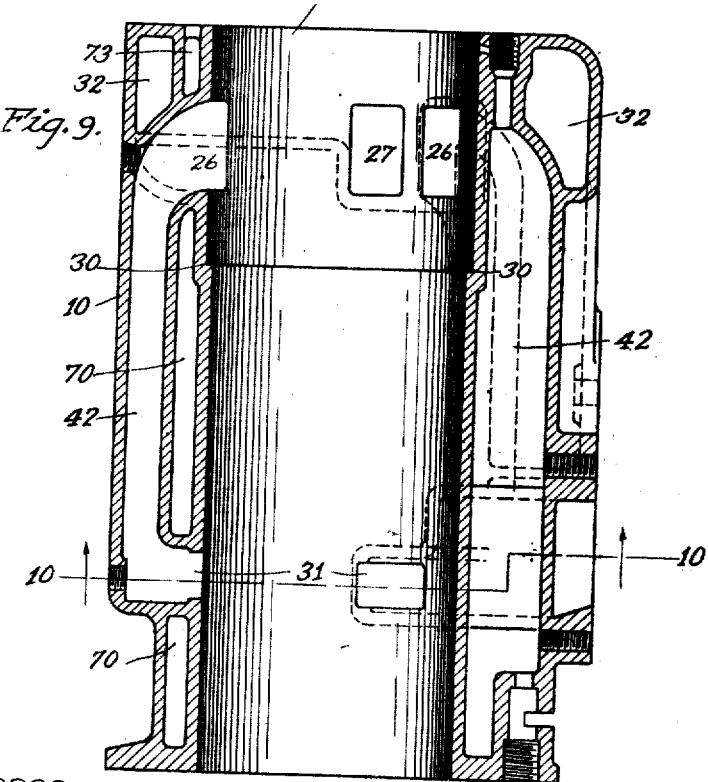

Fig. 7 is a horizontal sectional view taken on lines 7—7 of Fig. 6 and looking in the direction of the arrows;

Fig. 8 is a horizontal sectional view taken on lines 8—8 of Fig. 6 and looking in the direction of the arrows;

Fig. 9 is a vertical sectional view taken through one of the cylinders;

Fig. 10 is a horizontal sectional view taken on lines 10—10 of Fig. 9;

Fig. 11 is a side elevation of the rotary valve sleeve;

Fig. 12 is a bottom view of the sleeve shown in Fig. 11;

Fig. 13 is a sectional view taken on lines 13—13 Fig. 11 and looking in the direction of the arrows;

Fig. 14 is a sectional view taken on lines 14—14 of Fig. 11 and looking in the direction of the arrows;

Fig. 15 is a transverse vertical sectional view of the worm wheel, there being one of these wheels for each valve plate;

Fig. 16 is a top plan view of the wheel shown in Fig. 15;

Fig. 17 is a top plan view of the stationary port ring;

Fig. 18 is a vertical sectional view of the same taken on lines 18—18 of Fig. 17.

Fig. 19 is a plan view of the expansion ring which fits within the port ring.

Figure 26:
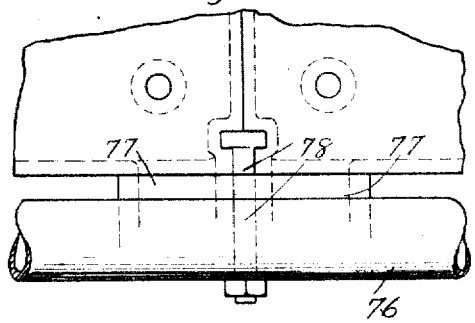
Figure 27:
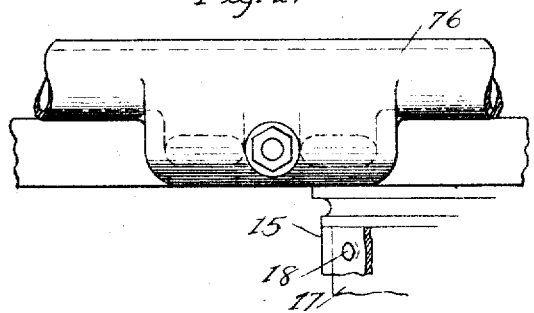
Figure 28:
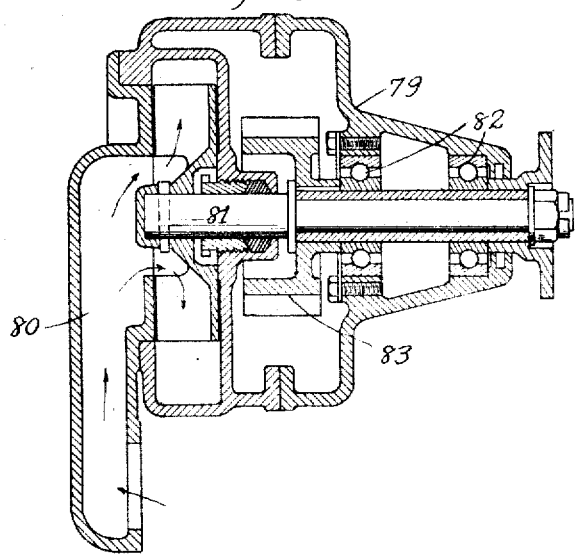

Fig. 20 is a side elevation of said port ring;

Fig. 21 is a sectional view taken on lines 21—21 of Fig. 19;

Fig. 22 is an enlarged detail view of the worm shaft and associated parts;

Fig. 23 is an end view of the shaft shown in Fig. 22 with parts broken away to disclose certain details of construction;

Fig. 24 is a side elevation of the oil pump with ports shown in dotted lines;

Fig. 25 is a sectional view taken on lines 25—25 of Fig. 24 and looking in the direction of the arrows;

Fig. 25^A is a cross sectional view of the valve arrangement for the pump;

Fig. 26 is a fragmentary detail view showing the manner of attaching the water manifold to the cylinder heads;

Fig. 27 is a side elevation of the parts shown in Fig. 26;

Fig. 28 is a detail sectional view on an enlarged scale;

Fig. 29 is an enlarged detail view of the valve mechanism controlling the supply of lubricating fluid to the cylinder heads.

Referring to the drawings—

1 designates as a whole a crank case, 2 the crank shaft and 3 the fly wheel. The crank is mounted in suitable bearings 4, 5, and 6. The lower end of the crank case serves as an oil pan 7 provided with oil troughs 8, 8. At the upper end, the crank casing is provided with a cylinder base 9 on which are supported the cylinders 10, 10. These cylinders are preferably constructed in pairs as shown, for example, in Figs. 1 and 8. These pairs of cylinders may each be removed independently of the other.

With each cylinder 10 is mounted the piston 11 connected by piston rod 13 to the crank 2 in any well known manner. Between each cylinder 10 and piston 11 is interposed a rotary valve sleeve 12 open at either end and extending the full length of the cylinder. To the lower end of each rotary valve sleeve 12 is secured a worm wheel 14, hereinafter more particularly described. Within the upper end of the cylinder is seated a detachable cylinder head 15, the lower end of which fits within the valve sleeve 12. The cylinder head is bolted or otherwise rigidly secured to the cylinder. Between the sleeve wall and the cylinder head is interposed a relatively stationary port ring 16, shown more clearly in detail in Figs. 17 and 18. This ring is provided with six circumferentially spaced ports 17 which register with the inlet and exhaust ports at the upper end of the cylinder walls, hereinafter described. The ported ring is locked against rotation by means of a pin 18 extending into the cylinder head. The ring is also split, as shown at 19 and 20, the split portions of the ring being offset and the ring being split through two oppositely disposed ports, as shown more clearly in Fig. 18. The ring is normally forced outwardly by a spring split collar 21 which rests upon a shoulder 22 formed in the lower end of the cylinder head and is provided at its upper face with a conical or tapered portion 23 projecting into a flaring portion 24 formed in the lower end of the port ring 16. The arrangement is such that the collar 21 normally tends to spread the port ring 16 so as to form a gas tight fit between the latter member and the rotary valve sleeve 12, while at the same time allowing the valve sleeve to rotate without undue friction. The central portion of the ported ring 16 i. e., that portion of the ring wall, opposite the ports, is counterbored as shown at 25 in order to insure of effecting expansion, and contraction of the ring. The valve sleeves in each pair of cylinders rotate in opposite directions, or in other words, clockwise and anti-clockwise. In the construction shown in Fig. 17 the rotary valve sleeve will be rotating in clockwise direction as indicated by the arrow, and the result will be that the rotation of the sleeve will tend to contract the ring 16 because of the location of the pin 18. In those cylinders in which the sleeve rotates in the opposite direction the pin 18 should be secured to the opposite side of the split portion of the ring 16. The object desired is to have the rotation of the sleeve tend to contract the ported ring 16 against the action of the collar 21. This insures more efficient lubrication and the parts are less liable to score should they run light on oil, for the reason that the more the ring contracts, due to friction of the sleeve, the greater will be the oil space between the ring and the sleeve.

Referring now to the ports in the cylinder wall, in the upper end of the latter are cast circumferentially extending inlet ports 26 and alternately disposed exhaust ports 27. Because, however, it is more or less difficult to accurately cast ports, I provide the cylinder with a stationary bushing 28 which is ported as shown at 29 to correspond with the inlet and exhaust ports of the cylinder wall proper. The ports in this bushing may be milled out with absolute accuracy that allows of a micrometer adjustment. The upper end of the cylinder wall is counterbored as shown more clearly in Fig. 1 to receive the bushing, the lower end of the latter resting on a shoulder 30 in the cylinder. The lower end of the cylinder is provided with three circumferentially disposed exhaust ports 31.

Gas is delivered to the inlet ports of the cylinders in the following manner—manifold 32 leads from the carbureter and is provided with extensions 33 and 34 which communicate with inlet chambers 35, 35 there being one of these chambers for each pair of cylinders. In other words, each inlet chamber 35 extends entirely around and between two cylinders, and communicates directly with the intake passages in the cylinder walls. The manifold is suitably bolted or otherwise secured to the cylinder, and the inlet chambers are preferably cast integral with the cylinder walls.

Referring now to the manner of delivering the exhaust gases from the cylinders, the four cylinders are provided with a common exhaust manifold 36 suitably bolted or otherwise secured to the cylinders, as shown at 37. It is to be particularly noted that the inlet and exhaust manifolds lie side by side and are preferably cast integrally, the object being that the exhaust gases passing out of the manifold will more or less heat the inlet gases passing through the inlet manifold. This is one of the important features of the present invention. From this manifold exhaust chambers 38, 39, 40 and 41 lead to and extend partially around the lower end of each cylinder, as shown more clearly in Fig. 10. Each exhaust chamber 38 to 41 communicates with the three exhaust ports at the bottom of each cylinder, respectively. The three exhaust ports at the top of each cylinder exhaust into the respective chambers 38 to 41 respectively, by means of vertically extending exhaust conduits 42, there being three of these conduits 42 in each cylinder, i. e., corresponding in number to the exhaust ports in the upper end of each cylinder. The exhaust chambers and the exhaust conduits just described are cast integrally with the cylinders.

It is also to be noted that the exhaust ports at the upper end of each cylinder wall are longer vertically than horizontally, while the exhaust ports at the lower end of the cylinder are longer horizontally than vertically. Also the inlet ports at the upper end of the cylinder are longer vertically than horizontally. The object of making the ports at the upper end of the cylinder longer vertically than horizontally is to get a larger port area in a given circumference of cylinder wall, and to do this without unduly weakening the cylinder wall.

Referring now to the ports in the rotary valve sleeve, the latter is provided at its upper end with, in the present instance, three circumferentially extending ports 43, which are of the same size and shape as the inlet and exhaust ports in the cylinder wall, and are spaced one hundred and twenty degrees apart. It will be seen that the ports in the upper end of the sleeve are equal in number to one-half the combined number of the inlet and exhaust ports in the upper end of the cylinder, and each port alternately registers with an inlet and exhaust port in the cylinder as the sleeve rotates. As will be seen in Fig. 7, the inlet ports 26 are spaced equi-distant apart, and the exhaust ports 27 are also spaced equi-distant apart and the inlet and exhaust ports are alternately disposed relative to each other. At its lower end each valve sleeve is provided with three circumferentially extending equi-spaced ports 44 adapted to register with the three exhaust ports in the lower end of the respective cylinder. Each sleeve is confined against vertical movement in the cylinder by a flange 45 which lies between the lower end of the cylinder and the upper face of the base but in such a way as not to interfere with the free rotation of the sleeve. The upper end of the sleeve projects into the space between the bushing and the stationary port ring heretofore referred to.

The novel manner of lubricating the various operating parts of the engine forms an important feature of the present invention. To this end, in the upper part of the crank casing is formed a supplemental oil or lubricating chamber 46 which extends entirely around the base just below the lower ends of the four cylinders, as shown more clearly in Figs. 1 and 4. Oil is delivered to this chamber from the main supply chamber oil reservoir 7 by means of a supply conduit 47 cast integrally with the upper and lower half of the crank case. Adjacent the rear pair of cylinders, this lubricating chamber 46 is provided with an enlarged extension 48 in which is mounted a gear pump 49. The latter comprises a pair of gears 50 and 51 mounted on trunnions 52, 53 journaled in suitable bearings. The trunnion of the shaft 53 of the gear is provided with an extension 53' carrying a spiral gear 54 which meshes with another spiral gear 55 mounted on a main worm shaft 56. The pump is provided with inlet ports 57 communicating with the conduit 47 and with an outlet 58 communicating with the supplemental lubricating chamber 46. The main object of the supplemental oil chamber 46 is that the worm shaft 56 which drives the rotary valve sleeves in the manner hereinafter described shall be constantly incased in oil.

The outlet 58 is controlled by ported valve sleeves 58' and 58''. The former is stationary and has ports 59' leading to the oil chamber 46. The sleeve 58'' rotates and has a port 60' adapted to register with the port 59'. This latter sleeve 58'' is rotatably journaled in the stationary sleeve and is provided with an operating shaft 61' manually controlled by lever arm 62' leading to any convenient place. To prevent leakage a washer 63' is interposed between a flange 64" and the threaded nut 65'. By adjusting the rotary sleeve the supply of oil from the pump can be readily controlled.

This supplemental oil chamber also supplies oil to the upper end of each cylinder. To this end each cylinder is provided with a pipe 59 communicating at its lower end with the chamber 46, as shown at 60, the flow being controlled by a needle valve 61. To prevent oil from backing through the pipe 59 there is interposed in the latter a ball check valve 62. In each pipe 59 is also a glass sight 63 so that it can be readily seen whether or not the oil is flowing properly through the pipes 59. At the upper end each pipe 59 is provided with a plug 64 provided with a plurality of apertures 65, the plug being threaded as shown at 66 into a suitable opening in the cylinder wall. Oil escapes through the apertures 65 into a circumferentially extending channel 67 counter-bored in the head just above the upper end of the sleeve. It may also be here stated that the head is provided with a gas relief or priming cup passageway 68 and priming cup 69.

As a feature of the invention I provide means not only for water-cooling the engine in the ordinary way, but also for water-cooling the lubricating fluid. Each pair of cylinders is provided with a single water jacket 70 which water jacket extends entirely around the two cylinders and from the top to the bottom of the same. This insures even temperature throughout the entire circumference and height of the respective cylinders. The water enters through inlet manifold which extends alongside of the four cylinders and communicates with the two water jackets through suitable passageways. The water after passing around the cylinder wall enters into an annular chamber 73 by means of a series of passages or conduits 74, and thence into the passageway 75 formed in the head, thence to the return manifold 76, and back to the radiator (not shown). Water escapes from the passageway 75 into the manifold 76 by conduits 77. The manifold 76 is bolted to the head as shown at 78 by T-headbolts. Water is delivered to the inlet manifold by means of a pump 79 having an inlet conduit 80 leading to the base of the radiator, (not shown). The detail of this pump is shown in Fig. 28.

It is to be particularly noted that the inlet water conduit lies alongside of the adjacent part of the lubricating chamber 46, the purpose of cooling the lubricating oil. This is a novel feature of the present invention. A fan 85 is provided, as usual, for cooling the radiator. Describing now the manner of rotating the rotary valve sleeves, the worm shaft 56, heretofore referred to is mounted on suitable bearings 86, 87 and 88. The rear end of the shaft 56 is mounted in a thrust bearing 89 of well known construction. At its front end the worm shaft is provided with a pair of interlocking gears 90 and 91, the former receiving the usual belt for driving the fan and water pump. The latter gear 91 is connected directly to the crank shaft by a link belt 92 and gear 93, the latter being mounted on the front end of the crank shaft.

Means are also provided for bodily adjusting the worm shaft in its casing. Accordingly, in the front end of the worm shaft is rigidly mounted a male gear 94 intermeshing with a female gear 95, the latter being bodily adjustable on the male gear and carrying the gears 90 and 91. The gears 94 and 95 are locked in adjusted position by means of lock nut 96 and cotter key 97. On the worm shaft 56 are mounted four worm gears 98, 98. Each worm gear is provided at both ends with a conical counterbored portion 99 adapted to receive the conical ends 100 of lock nuts 101. These lock nuts are internally threaded as shown at 102 to engage threaded portions 103 on the worm shaft. By the arrangement just described the worms can be adjusted endwise on the worm shaft, if necessary, and then positively locked in such adjusted position. The flange 45 on the lower end of each sleeve is provided with three circumferentially spaced notched portions 104 adapted to register with the locking dogs 105 carried by a worm wheel 106. The worm 107 of each worm wheel 106 intermeshes with the corresponding worm wheels 98 and is thus driven by the rotation of the worm shaft. Preferably, the lower ends of each worm wheel 106 are provided with a plurality of oil ducts 108. By reference to Fig. 4 it will be seen that these worm wheels are all inclosed in the supplemental oil chamber. Inasmuch as the various ports in the rotary valve sleeve are all spaced equi-distant apart, and the locking recess 104 and locking dogs 105 are similarly spaced, the sleeve must of necessity be fitted in proper position.

In Fig. 4ᴬ, I have shown a somewhat modified form of construction. This modification consists in providing the head with a sleeve-like extension 109 which extends the full length of the cylinder wall and is interposed between the outer wall of the piston 11 and the rotating sleeve 12. This modified form of construction by separating the piston from the sleeve obviates the possibility of the rotation of the sleeve interfering with the reciprocating of the piston or vice versa.

In the present instance, I have shown a four cylinder four-cycle engine. As the piston starts down on the first intake stroke the ports in the upper end of the sleeve register with the inlet ports in the upper end of the cylinder, and the supply of gas rushes into the cylinder. At this time the exhaust ports at the upper end of the cylinder are closed by the rotary valve sleeve, and at the lower end of the cylinder are closed by both the sleeve and the cylinder. As the piston descends on the intake stroke, it draws in the gas by vacuum. As the piston descends and reaches the end of its intake stroke, all the inlet and exhaust ports are closed. As the piston starts up on the compression stroke, the ports remain closed until the piston reaches the end of the compression stroke. At the beginning of the power stroke, the ports are all closed, and remain closed during said stroke. As the piston reaches the end of the power stroke, the sleeve has rotated so that its lower ports register with the exhaust ports in the lower end of the cylinder. As the piston uncovers the exhaust ports at the lower end the consumed gases escape into the exhaust manifold.

The exhaust ports at the upper end of the cylinder are now open while the inlet ports remain closed, and these upper exhaust ports remain closed while the piston is completing its fourth or scavenging stroke. It is to be understood that when the exhaust ports in number one cylinder, for example, are open, the exhaust ports in cylinders, two, three and four are closed and when the inlet ports in any one cylinder are open, the inlet ports in all the other three cylinders are closed. This will be true regardless of the number of cylinders, in a construction of the present character.

It is to be noted that by reason of the fact that the inlet and exhaust manifolds lie alongside of each other, i. e., with the radiating surfaces substantially in contact, accordingly, I can use cold fuel in the carbureter and dry the gases by heat of the exhaust manifold. In other words, the fuel and air are treated in the manifold after mixing.

The invention is not limited to the details of construction shown except as set forth in the appended claims.

I claim as my invention—

1. In a gas engine, the combination with a plurality of cylinders, of a ported rotary valve sleeve in each cylinder, gearing at the lower end of said sleeves for actuating said sleeves, a drive shaft for said gearing, a supplementary casing inclosing said shaft, means for supplying lubricant to said supplementary casing, oil pipes leading from the casing to the upper end of each cylinder, and a channel member at the upper end of each cylinder for receiving oil from the oil pipe.

2. In a gas engine, the combination with a plurality of cylinders, of a ported rotary valve sleeve in each cylinder, gearing at the lower end of said sleeves for actuating said sleeves, a drive shaft for said gearing, a supplementary casing inclosing said shaft, means for supplying lubricant to said supplementary casing, oil pipes leading from the casing to the upper end of each cylinder, a channel member at the upper end of each cylinder for receiving oil from the oil pipe, and a checkvalve in each pipe and an aperture member interposed between the delivery end of the pipe and said channel portion.

3. In a gas engine, the combination with a plurality of cylinders, of a ported rotary valve sleeve in each cylinder, gearing at the lower end of said sleeves for actuating said sleeves, a drive shaft for said gearing, a supplementary casing inclosing said shaft, means for supplying lubricant to said supplementary casing, oil pipes leading from the casing to the upper end of each cylinder, a channel member at the upper end of each cylinder for receiving oil from the oil pipe, and means for cooling the lubricating fluid, comprising water jackets surrounding the cylinders.

MARTIN L. WILLIAMS.

Witnesses:
JOYCE M. LUTZ,
C. B. BELKNAP.